(12) United States Patent
Hadas et al.

(10) Patent No.: US 10,324,653 B1
(45) Date of Patent: Jun. 18, 2019

(54) FAST EVACUATION OF A CLONED DISK TO A STORAGE DEVICE

(71) Applicant: Red Hat Israel, Ltd., Ra'anana (IL)

(72) Inventors: Arik Hadas, Herzliya (IL); Maor Lipchuk, Tel-Aviv (IL)

(73) Assignee: Red Hat Israel, Ltd., Ra'anana (IL)

(*) Notice: Subject to any disclaimer, the term of this patent is extended or adjusted under 35 U.S.C. 154(b) by 5 days.

(21) Appl. No.: 15/828,703

(22) Filed: Dec. 1, 2017

(51) Int. Cl.
| G06F 9/455 | (2018.01) |
| G06F 3/06 | (2006.01) |
| G06F 11/14 | (2006.01) |
| G06F 11/20 | (2006.01) |

(52) U.S. Cl.
CPC .......... G06F 3/0647 (2013.01); G06F 3/0662 (2013.01); G06F 9/45558 (2013.01); G06F 11/1464 (2013.01); G06F 11/2074 (2013.01); G06F 2009/45562 (2013.01)

(58) Field of Classification Search
CPC ............... G06F 9/45558; G06F 2009/45562
See application file for complete search history.

(56) References Cited

U.S. PATENT DOCUMENTS

| 8,880,470 | B2 | 11/2014 | Mashtizadeh et al. | |
| 9,760,450 | B2 | 9/2017 | Beeken et al. | |
| 2010/0299667 | A1* | 11/2010 | Ahmad | G06F 12/1018 718/1 |
| 2012/0272236 | A1* | 10/2012 | Baron | G06F 9/4416 718/1 |
| 2012/0278533 | A1 | 11/2012 | Mudhiganti et al. | |
| 2015/0089172 | A1* | 3/2015 | Kulkarni | G06F 3/065 711/162 |
| 2015/0242147 | A1* | 8/2015 | Sakaguchi | G06F 11/14 711/162 |
| 2016/0117163 | A1* | 4/2016 | Fukui | G06F 8/65 717/171 |
| 2016/0378527 | A1 | 12/2016 | Zamir | |
| 2017/0228246 | A1 | 8/2017 | Kotha et al. | |
| 2018/0060104 | A1* | 3/2018 | Tarasuk-Levin | G06F 9/45558 |
| 2019/0020731 | A1* | 1/2019 | Govindankutty | H04L 67/34 |

OTHER PUBLICATIONS vSphere API/SDK Documentation—vSphere Web Services SDK Documentation—vSphere Web Services SDK Programming Guide—Virtual Machine Management; Linked Virtual Machines; https://pubs.vmware.com/vsphere-50/index.jsp?topic=%2Fcom.vmware.wssdk.pg.doc_50%2FPG_Ch11_VM_Manage.13.4.html; retrieved Oct. 9, 2017 (4 pages).

Petra Jorgenson; How to Create VMware Templates; published Mar. 14, 2012; (6 pages).

\* cited by examiner

*Primary Examiner* — Edward J Dudek, Jr.
(74) *Attorney, Agent, or Firm* — K&L Gates LLP (57) ABSTRACT

A method for fast evacuation of a cloned disk to a storage device includes a source storage device generating a first write volume, where new written data is stored in the first write volume. A destination storage device generates a second write volume, where the new written data is also stored. The destination storage device generates a delta volume in a cloned disk, which is also located in the destination storage device. Differences between a template volume and a modified template volume are stored to the delta volume. The destination storage device merges the template volume and the delta volume, creating a second modified template volume.

20 Claims, 10 Drawing Sheets

FAST EVACUATION OF A CLONED DISK TO A STORAGE DEVICE

BACKGROUND

Computer systems may employ isolated guests such as virtual machines that communicate with physical devices. A virtual machine (VM) is a software implementation of a computer that executes programs in a way similar to a physical machine. A virtual machine may include a virtual disk which may include one or more volumes. The isolated guest may share underlying physical hardware resources between different components of the computer system. Virtualized systems allow multiple isolated guests to run on a single physical host, which allows flexibility and scalability offered by running services or applications on the isolated guests. For example, an isolated guest may perform tasks associated with the functions of physical devices or other resources on the computer system by sending and receiving data over a network.

SUMMARY

The present disclosure provides new and innovative methods and systems for fast evacuation of a cloned disk to a storage device. An example method includes a source storage device generating a first write volume, where new written data is stored in the first write volume. A destination storage device generates a second write volume, where the new written data is also stored. The destination storage device generates a delta volume in a cloned disk, which is also located in the destination storage device. Differences between a template volume and a modified template volume are stored to the delta volume. The destination storage device merges the template volume and the delta volume, creating a second modified template volume.

An example system includes a virtualization manager, and one or more storage devices including a destination storage device and a source storage device, where the source storage device generates a first write volume, where new written data is stored in the first write volume. The destination storage device generates a second write volume, where the new written data is also stored. The destination storage device generates a delta volume in a cloned disk, which is located in the destination storage device. The delta volume stores differences between a template volume and a modified template volume. The destination storage device merges the template volume and the delta volume creating a second modified template volume.

Additional features and advantages of the disclosed methods and system are described in, and will be apparent from, the following Detailed Description and the Figures.

DETAILED DESCRIPTION OF EXAMPLE EMBODIMENTS

Virtual machines are typically created from virtual machine templates that are installed with an operating system and optionally some set of applications. By using a virtual machine template, administrators may not need to install each virtual machine separately from scratch, and this may help to accelerate virtual machine provisioning. It may be desirable, for a number of reasons, to migrate a virtual disk that may be used by a running virtual machine from one storage device to another storage device. For example, the storage device being used to run the virtual machine may be old and in need of repair or replacement; the number of storage devices utilized may be minimized in order to reduce electricity usage; virtual disks in a system may be split between as many storage devices as possible in order to be more fault tolerant; etc.

Typically, for a desktop virtual machine, the virtual machine disk includes a set of volumes including a template volume and one or more volumes on top of the template volume. The volume(s) on the template volume may include any changes or modifications to the virtual machine that is made. Therefore, the migration of volumes of a desktop virtual machine from one storage device to another storage device may merely require the volume(s) on top of the template volume to be transferred to the new storage device if the new storage device is also equipped with the template volume. For example, if the template volume includes 15 gigabytes of data and the volume(s) on top includes 5 gigabytes of data, only the 5 gigabytes on top will be transferred to the new storage location.

However, storage migration of a server virtual machine is typically handled differently than a desktop migration. A server virtual machine disk may begin with a template volume, but any changes or modifications made to the virtual machine are typically made directly to the template volume, creating a modified template volume. This is typically the case in order to minimize the number of volumes in the disk's chain. However, in order to migrate a disk of a server virtual machine from one storage location to another storage location, usually the entire modified template volume must be transferred. For example, the server virtual machine disk may originally include a template volume with 15 gigabytes of data. However, as time progresses for example, 5 gigabytes of modifications may be added to the template volume. In order to transfer the server virtual machine's disk to another storage location, all 20 gigabytes of data may need to be transferred from an old storage location to a new storage location, even though the new storage location may already include the template volume (the original 15 gigabytes of data). This type of migration is typically relatively inefficient, taking longer than necessary and using unnecessary bandwidth.

The present disclosure provides a possible solution to this problem. For example, a source storage location includes a virtual machine disk that needs to be transferred to a destination storage location. The source storage location includes a volume of data that was once a template volume, but over time has been modified, and is now a modified template volume (e.g., 20 gigabytes of data, 5 gigabytes of data are modifications and 15 gigabytes are those that were originally present). The destination storage location includes the original template volume (e.g., 15 gigabytes). Both the source storage location and the destination storage location create a new volume to store any newly written data. This way, newly written data does not also need to be transferred over from the source storage location to the destination storage location. Next, the destination storage location creates a differences volume, which is a volume that stores the modifications that were made to the modified template volume over time at the source storage location (e.g., 5 gigabytes). The original template volume at the destination storage location is then merged with the differences volume that stored the changes/modifications to create a copy of the modified template volume (e.g., 20 gigabytes). Then, the new volume at the destination storage location that includes the newly written data is also merged with the just created modified template volume located at the destination storage location. This creates a virtual machine disk that includes all the modifications and updates needed without having more volumes than necessary, which typically helps the virtual machine run more efficiently. This way, only the differences (e.g., the 5 gigabytes of changed data) may need to be copied over to the new storage location, but without the inefficiencies of the multiple volumes typically associated with a desktop virtual machine. In this example, the time to migrate a disk of a server virtual machine has been decreased significantly. For example, since in this example 15 gigabytes less of data, or ¾ less data, had to be transferred than previously, the migration may be approximately 75% faster. The increase in speed is generally proportional to the ratio of data transfer.

Figure 1:
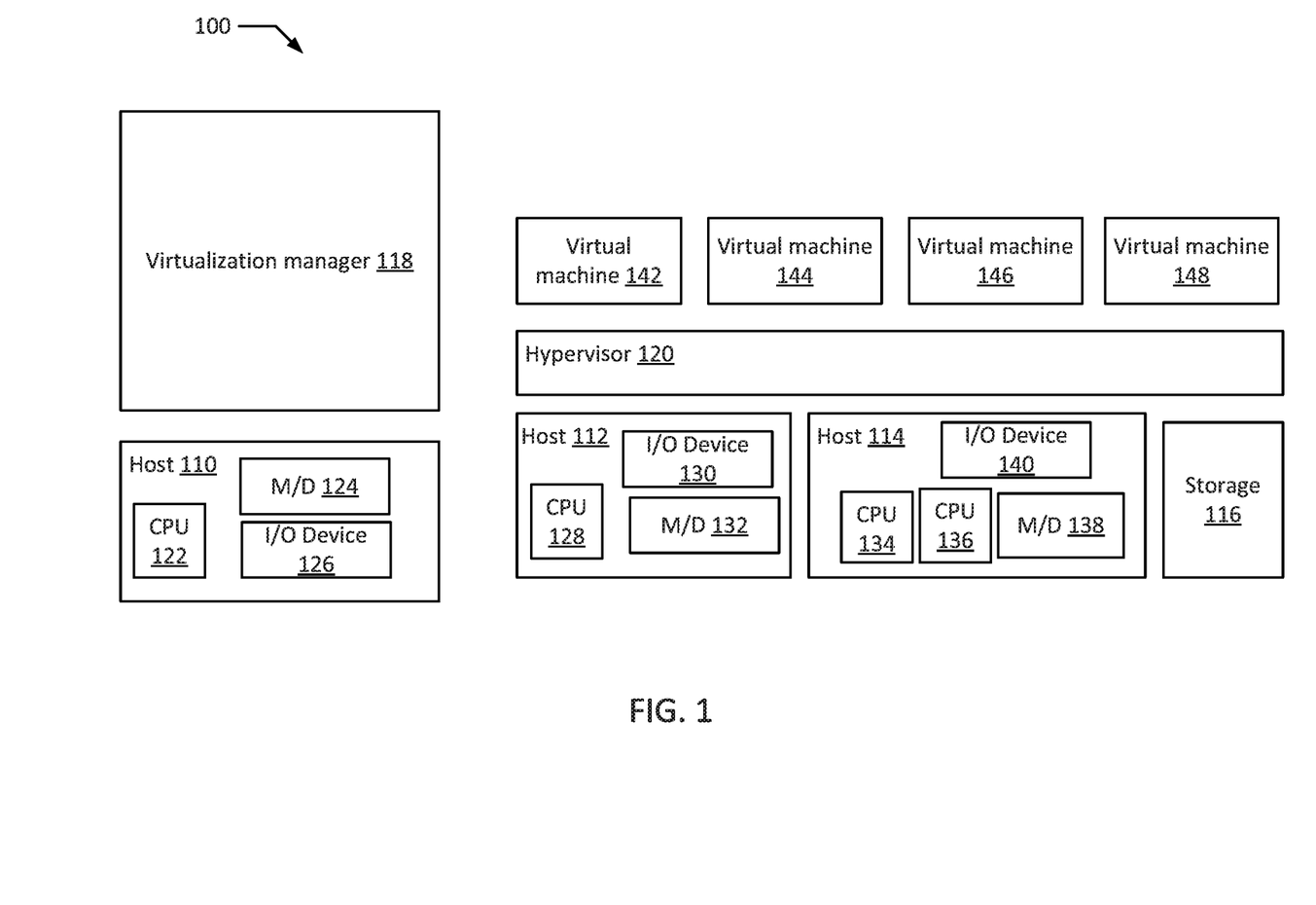
FIG. 1 is a block diagram of an example virtualization system according to an example of the present disclosure.

FIG. 1 depicts a high-level component diagram of an example virtualization system 100 for different availability and performance requirements. For example, the system 100 may include hosts 110, 112, and 114 and storage 116. Host 110 may include CPU 122, memory device ("MID") 124, and input/output device ("I/O") 126. Host 112 may include CPU 128, I/O device 130, and M/D 132. Host 114 may include CPUs 134 and 136, device 140 and MID 138. The system further includes hypervisor 120, virtualization manager 118 and virtual machines 142, 144, 146, and 148.

In an example, the virtualization manager 118 directs the hosts 110, 112, and 114 to migrate the disks of virtual machines 142, 144, 146, and 148 when necessary or requested.

As discussed herein, a memory device refers to a volatile or non-volatile memory device, such as RAM, ROM, EEPROM, or any other device capable of storing data. As used herein, physical processor or processor refers to a device capable of executing instructions encoding arithmetic, logical, and/or I/O operations. In one illustrative example, a processor may follow Von Neumann architectural model and may include an arithmetic logic unit (ALU), a control unit, and a plurality of registers. In a further aspect, a processor may be a single core processor which is typically capable of executing one instruction at a time (or process a single pipeline of instructions), or a multi-core processor which may simultaneously execute multiple instructions. In another aspect, a processor may be implemented as a single integrated circuit, two or more integrated circuits, or may be a component of a multi-chip module (e.g., in which individual microprocessor dies are included in a single integrated circuit package and hence share a single socket). A processor may also be referred to as a central processing unit (CPU). Processors may be interconnected using a variety of techniques, ranging from a point-to-point processor interconnect, to a system area network, such as an Ethernet-based network. In an example, the one or more physical processors may be in the system 100. In an example, all of the disclosed methods and procedures described herein can be implemented by the one or more processors. Further, the fast evacuation system 100 may be distributed over multiple processors, memories, and networks.

Further, virtualization system 100 may also include an input/output devices (e.g., a network device, a network interface controller (NEC), a network adapter, any other component that connects a computer to a computer network, a peripheral component interconnect (PCI) device, storage devices, sound or video adaptors, photo/video cameras, printer devices, keyboards, displays, etc.). For example, the I/O devices 126, 130, 140 may be coupled to a processor.

Figure 2A:
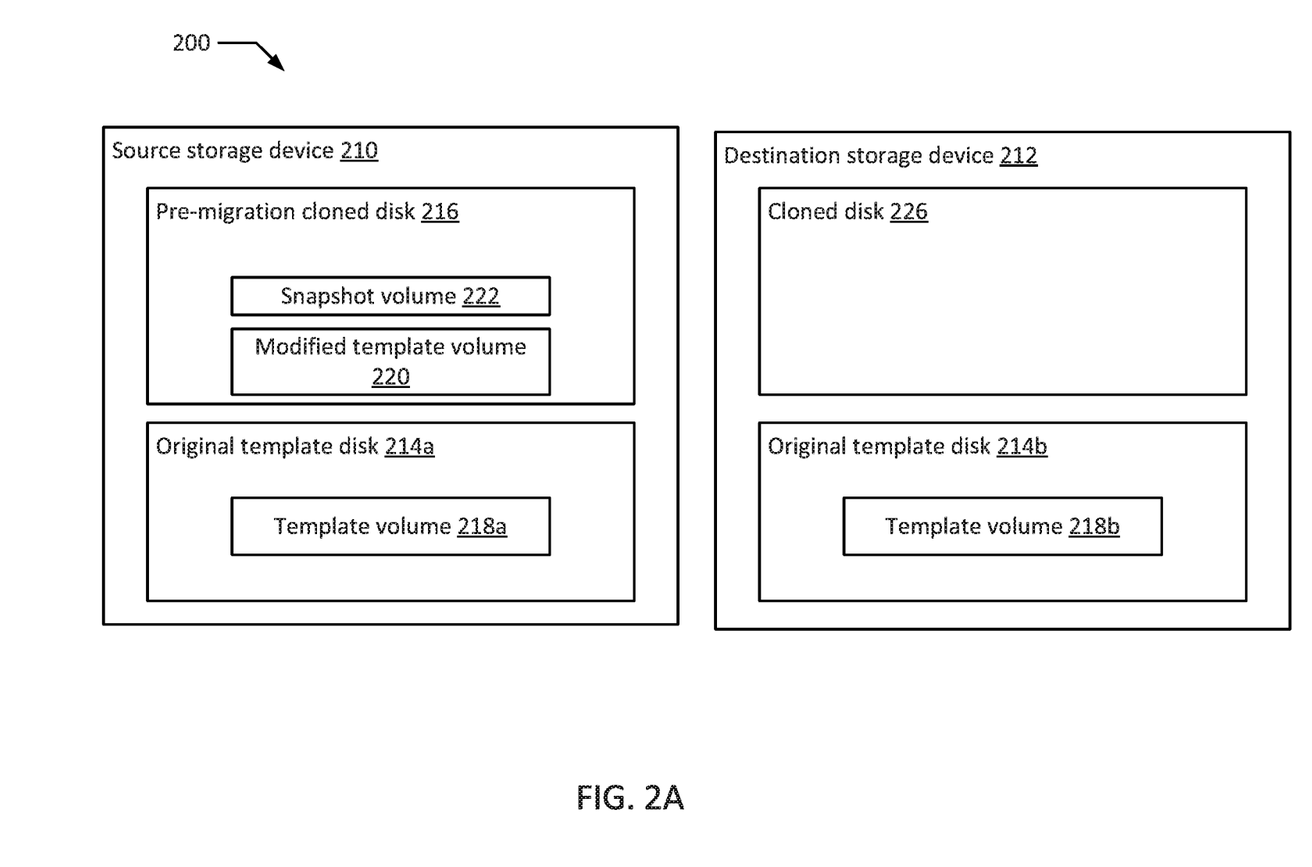
FIGS. 2A through 2E are block diagrams of an example fast evacuation of a cloned disk in a virtualization system over time according to an example of the present disclosure.

FIGS. 2A through 2E are block diagrams of an example fast evacuation of a cloned disk in a virtualization system over time according to an example of the present disclosure. FIG. 2A illustrates a first Hock diagram of an example virtualization system 200 at a first time according to an example of the present disclosure. In the example, system 200 contains a source storage device 210 and a destination storage device 212. Source storage device 210 and destination storage device 212 may be located in the same data center. In an example, source storage device 210 and destination storage device 212 maybe provided within the same host. Alternatively, source storage device 210 and destination storage device 212 may be located on different hosts. A virtualization manager may receive a request to migrate a single disk, multiple disks, or all the disks of a virtual machine from source storage device 210 to destination storage device 212. Located on source storage device 210 is pre-migration cloned disk 216 which may be cloned/migrated to the destination storage device 212 as cloned disk 226. Source storage device 210 also includes original template disk 214a. Original template disk 214a may include template volume 218a. In an example, all source storage locations and destination storage locations include original template disks. For example, destination storage device 212 also includes an original template disk 214b. Original template disk 214b is identical to original template disk 214a. Similarly, original template disk 214b includes template volume 218b. Template volume 218b is identical to template volume 218a. In an example, at this point in time cloned disk 226 is empty. Pre-migration cloned disk 216 may include modified template volume 220 and optionally include snapshot volume 222. In an alternative example, snapshot volume 222 does not exist in pre-migration cloned disk 216. Modified template volume 220 may have originally been identical to template volume 218a, however, over time, changes and additions to virtual machine running with pre-migration cloned disk 216 may have been made directly to modified template volume 220, making it different from template volumes 218a and 218b.

Figure 2B:
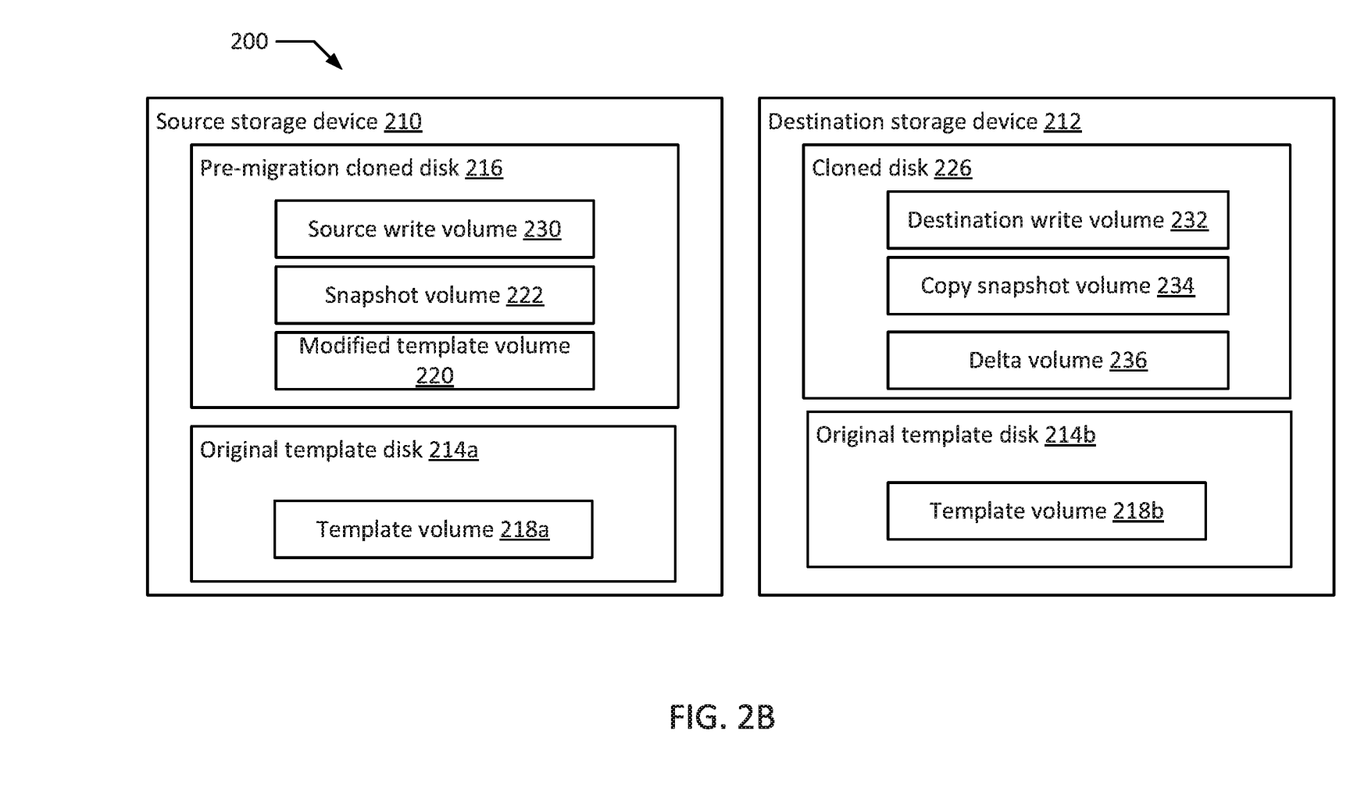

FIG. 2B illustrates a second block diagram of an example virtualization system 200 at a second time according to an example of the present disclosure. In the example, after virtualization manager receives a request to prepare for migration of a virtual machine from source storage device 210 to destination storage device 212, the virtualization manager directs source storage device 210 and destination storage device 212 to prepare for migration. In response, destination storage device 212 may create in cloned disk 226 destination write volume 232 and delta volume 236. In response, pre-migration cloned disk 216 may create source write volume 230. From this point in time, any information written to the source storage device 210 may be stored in source write volume 230. Any information written to pre-migration cloned disk 216 (e.g., in source write volume 230) may be copied into and/or also written to cloned disk 226

(e.g., in destination write volume 232). Further, destination storage device 212 may store a copy of snapshot volume 222 in cloned disk 226, such as copy snapshot volume 234. In an alternative example where snapshot volume 222 does not exist, copy snapshot volume 234 would not be stored on cloned disk 226.

Figure 2C:
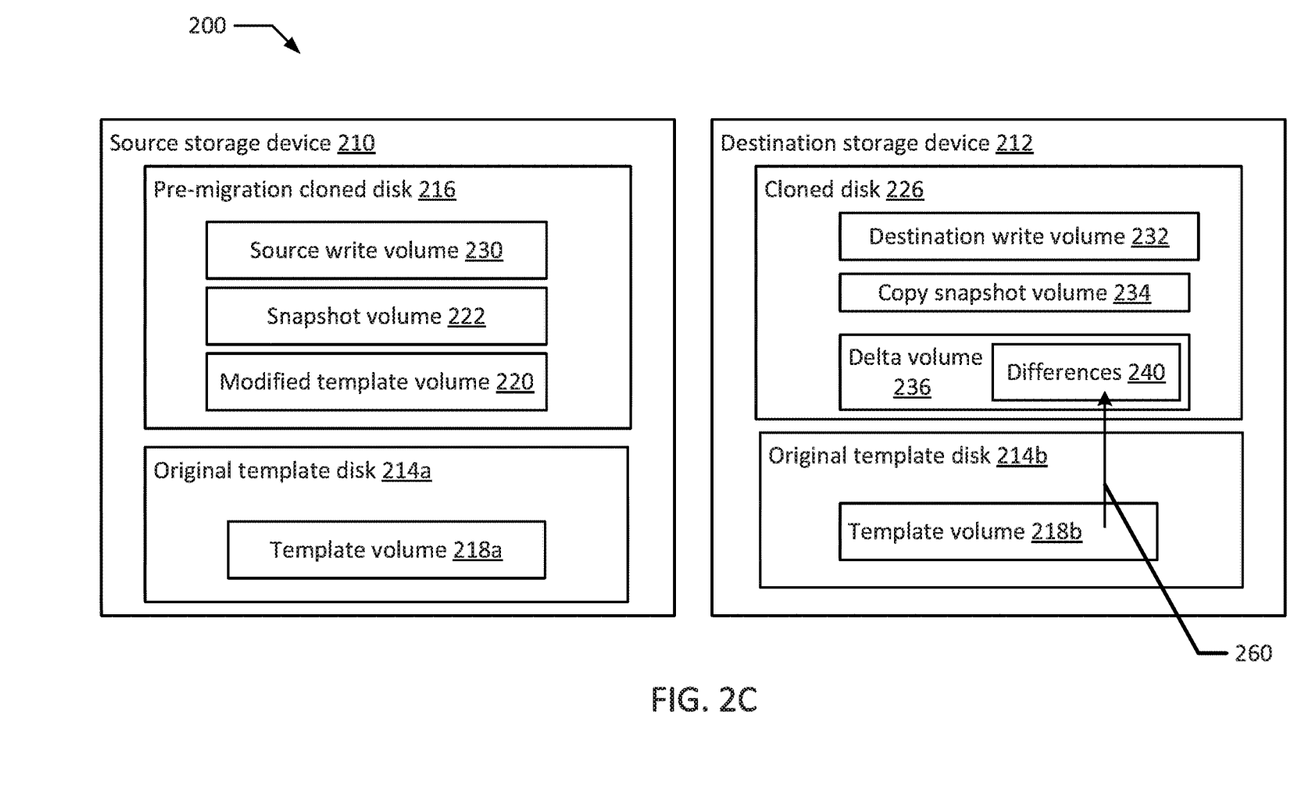
Figure 2D:
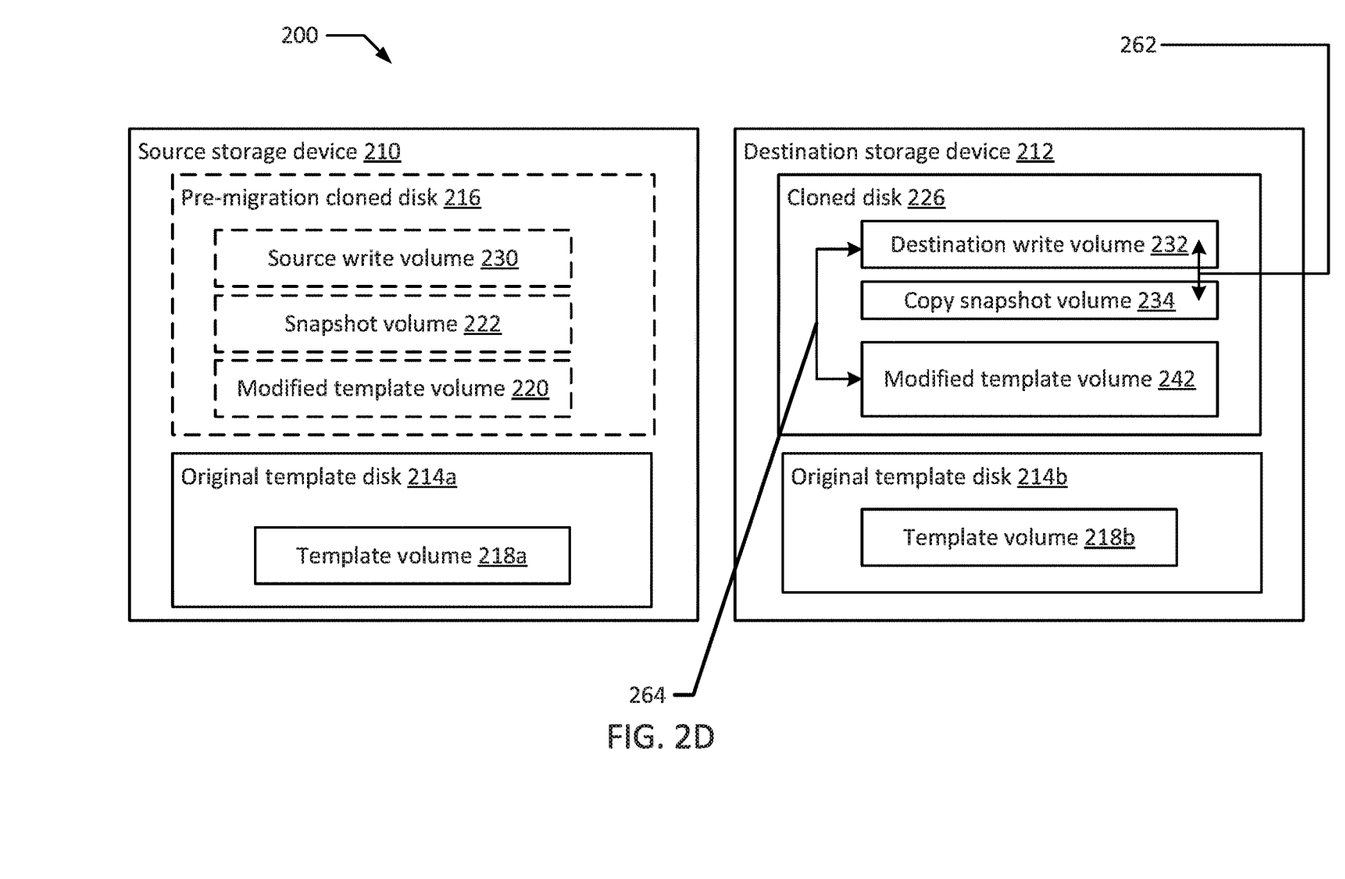

FIG. 2C illustrates a third Hock diagram of an example virtualization system 200 at a third time according to an example of the present disclosure. In the example, after source storage device 210 and destination storage device 212 have finished preparing for migration, the virtualization manager may instruct the source storage device 210 and the destination storage device 212 for migration to occur. First, differences 240 between modified template volume 220 and template volume 218b may be stored in delta volume 236. Next, as indicated by arrow 260, template volume 218b is copied and merged with delta volume 236. The result of this merger may be found in FIG. 21) as the creation of modified template volume 242. In an example, the differences 240 could additionally be stored by the virtualization manager, the source storage device 210 or the destination storage device 212 for later or future use.

FIG. 2D illustrates a fourth block diagram of an example virtualization system 200 at a fourth time according to an example of the present disclosure. At this point in time, modified template volume 242 may be identical to modified template volume 220. Destination write volume 232 and copy snapshot volume 243 may be merged as indicated by arrow 262 creating write; copy snapshot volume 246 in FIG. 2E. In an alternative example, if snapshot volume 222 and copy snapshot volume 234 do not exist, modified template volume 242 and destination write volume 232 are merged as indicated by arrow 264 creating an updated modified template volume. The virtualization manager may direct source storage device 210 to remove pre-migration clone disk 216 from source storage device 210, as indicated by the dotted lines. Once removed, source storage device 210 may be used for other virtual machines, tasks; or processes. In an alternative example, pre-migration cloned disk 216 may be removed from the source storage device 210 immediately following the differences 240 being stored in delta volume 236.

Figure 2E:
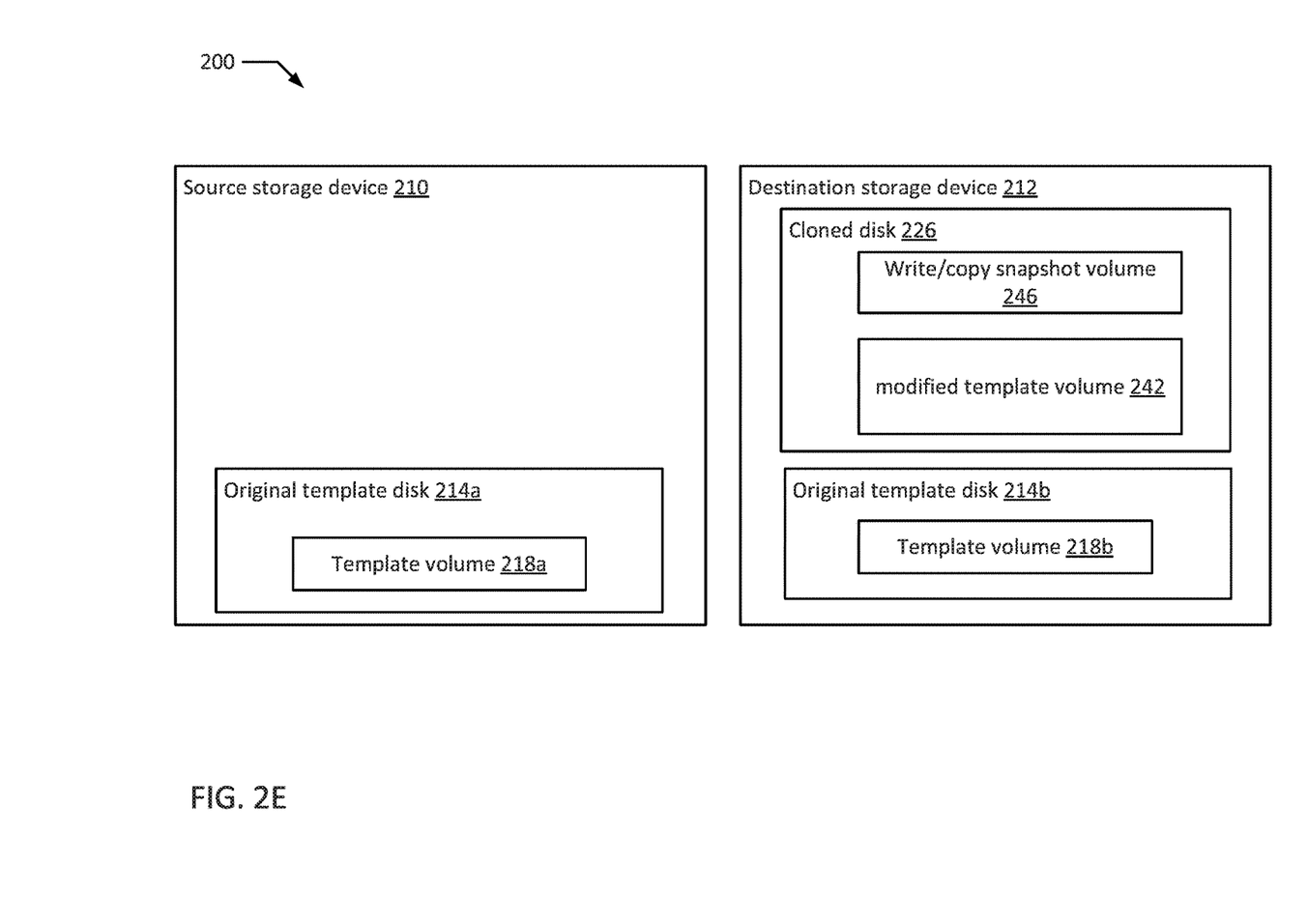

FIG. 2E illustrates a fifth block diagram of an example virtualization system 200 at a fifth time according to an example of the present disclosure. In the example, FIG. 2E discloses system 200 with pre-migration cloned disk 216 removed from source storage device 210. If a virtual machine was previously running with pre-migration cloned disk 216, during the process it may be shifted to begin running with cloned disk 226. If a virtual machine was not previously running with pre-migration cloned disk 216, the virtual machine may begin running directly with cloned disk 226. Further, as depicted in FIG. 2E, original template disk 214a and template volume 218a may remain unaltered and unaffected on source storage device 210. This may be useful for other modified templates from other source storage locations to be migrated to source storage device 210 at a later time. Further, original template disk 214b and template volume 218b may remain unaltered and unaffected on destination storage device 214. This may be useful for other modified templates from other source storage locations to be migrated to destination storage device 212 at a later time. Original template disks 214b, 214a and template volumes 218b, 218a may, in an example, be used as a source or destination to migrate volumes to or from a different third storage location. In an example, the source storage device 210 receives a second instruction to migrate a cloned disk to a second storage device. In this example, new source write volumes and destination write volumes may not need to be created since they may already exist in the new source and destination locations. Further, in the example, the second storage device may create a new delta volume which stores differences between the template volume 218b and another modified volume located at source storage device 210. Then, in the example, the delta volume and a template volume existing at the second storage device are merged.

Figure 3:
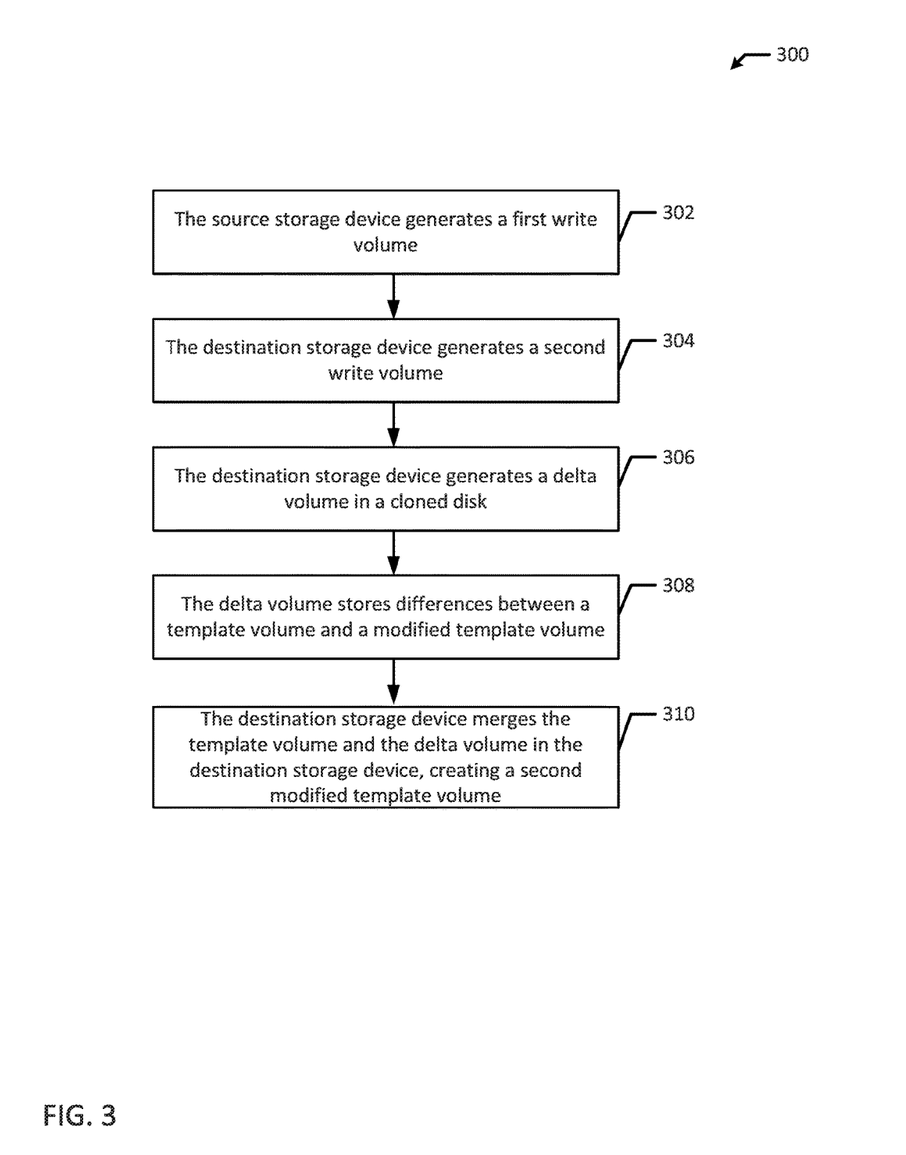
FIG. 3 is a flowchart illustrating an example method for fast evacuation of a cloned disk to a storage device.

FIG. 3 is a flowchart illustrating an example method 300 for fast evacuation of a cloned disk to a storage device. Although the example method 300 is described with reference to the flowchart illustrated in FIG. 3, it will be appreciated that many other methods of performing the acts associated with the method may be used. For example, the order of some of the blocks may be changed, certain blocks may be combined with other blocks, and some of the blocks described are optional.

The method 300 begins by the source storage device generating a first write volume (block 302). For example, source storage device 210 may represent the source storage device. In the example, source storage device 210 generates a first write volume, or source write volume 230. The first write volume may be located within a pre-migration cloned disk 216. Also within the pre-migration cloned disk 216 may be a modified template volume 220. After this point, for example, all data written to the pre-migration cloned disk 216 is stored in the first write volume 230.

Next, the destination storage device generates a second write volume (block 304). For example, destination storage device 212 may represent the destination storage device. In the example, destination storage device 212 generates a second write volume, or destination write volume 232, which is located within a cloned disk 226. After this point, for example, all data stored in the first write volume 230 is mirrored to the second write volume 232.

Next, the destination storage device generates a delta volume in a cloned disk (block 306), and the delta volume stores differences between a template volume and a modified template volume (block 308). For example, destination storage device 212 generates a delta volume 236 that is also located within the cloned disk 226, and the delta volume 236 will store any differences 240 between an original template volume, such as template volume 218a or 218h, and the modified template volume 220. For example, the modified template volume 220 may include 20 gigabytes of data, and the modified template volume 220, in the example, may have originally been a copy of a template volume, but was changed over time as adjustments were made to the virtual machine running with the pre-migration cloned disk 216. In the example, most of the data in the modified template volume 220 may be identical to the template volume that existed when a virtual machine was first created and stored onto the pre-migration cloned disk 216, however, 6 gigabytes of that data may have been added or modified in order to improve the speed or functionality of the virtual machine. Therefore, in the example, the delta volume 236 stores the differences 240 between what was the original template volume and the modified template volume 220 (the example 6 gigabytes of additional or modified data). The template volume 218b may be stored on destination storage device 212. In an example the template volume 218b on destination storage device 212 may be referred to as the backing volume (or parent volume) for the delta volume 236.

Next, the destination storage device merges the template volume and the delta volume in the destination storage device, creating a second modified template volume (block 310). For example, in destination storage device 212, the stored template volume 218b and the delta volume 236 are merged together creating a second modified template volume such as modified template volume 242. This merging may be performed by copying content from the template volume 218b that has not been overridden by the content of the delta volume 236, and storing that content into the delta volume 236 to create the second modified template volume 242. Once the merging is done, for example, the template volume 218b located in destination storage device 212 no longer serves as the backing volume for the second modified template volume 242. Further, this second modified template volume 242 should be nearly identical to the modified template volume 220 located on source storage device 210. For example, the content of 242 should be identical to the contents of 220.

Figure 4A:
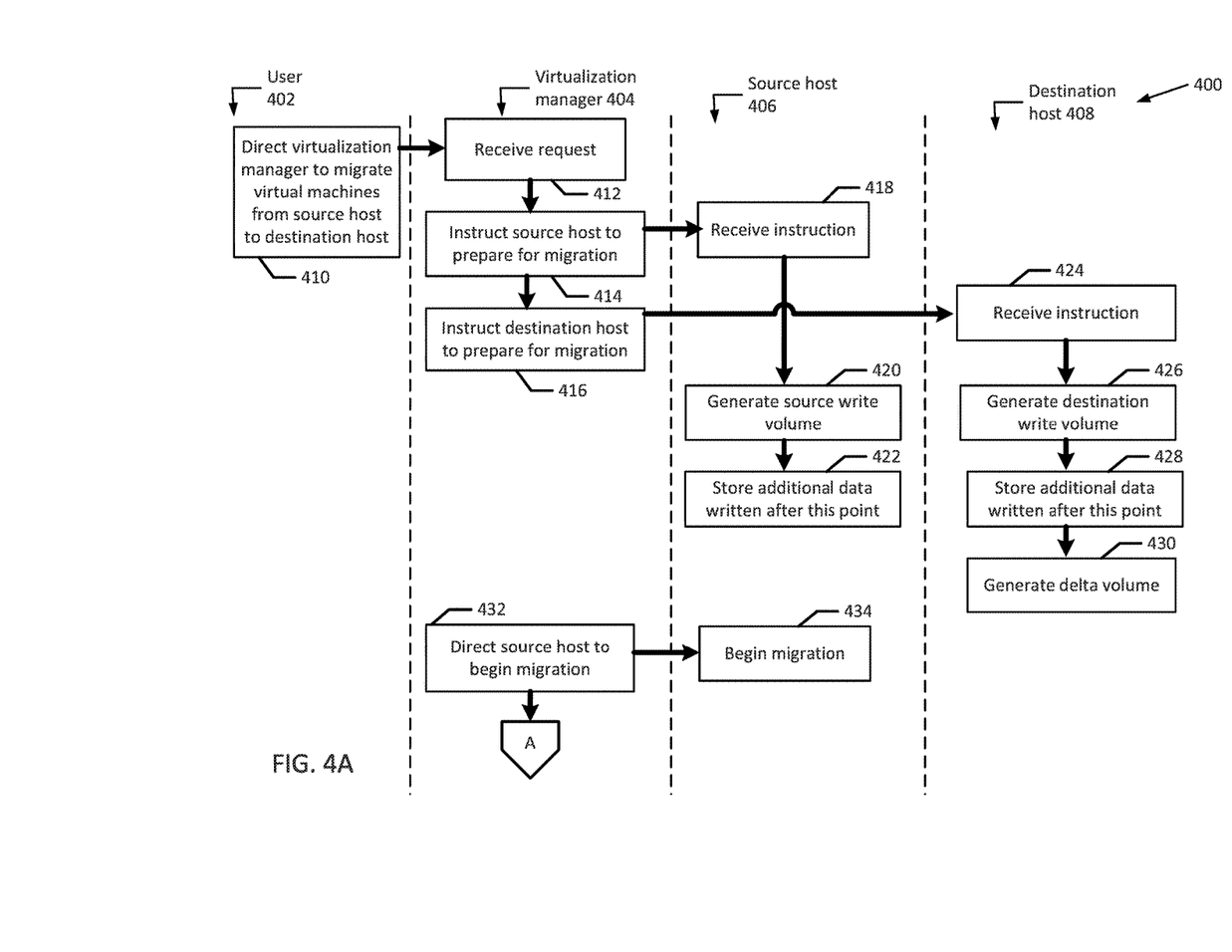
FIGS. 4A and 4B provide a flow diagram illustrating example methods of operating a system for fast evacuation of a cloned disk to a storage device.
Figure 4B:
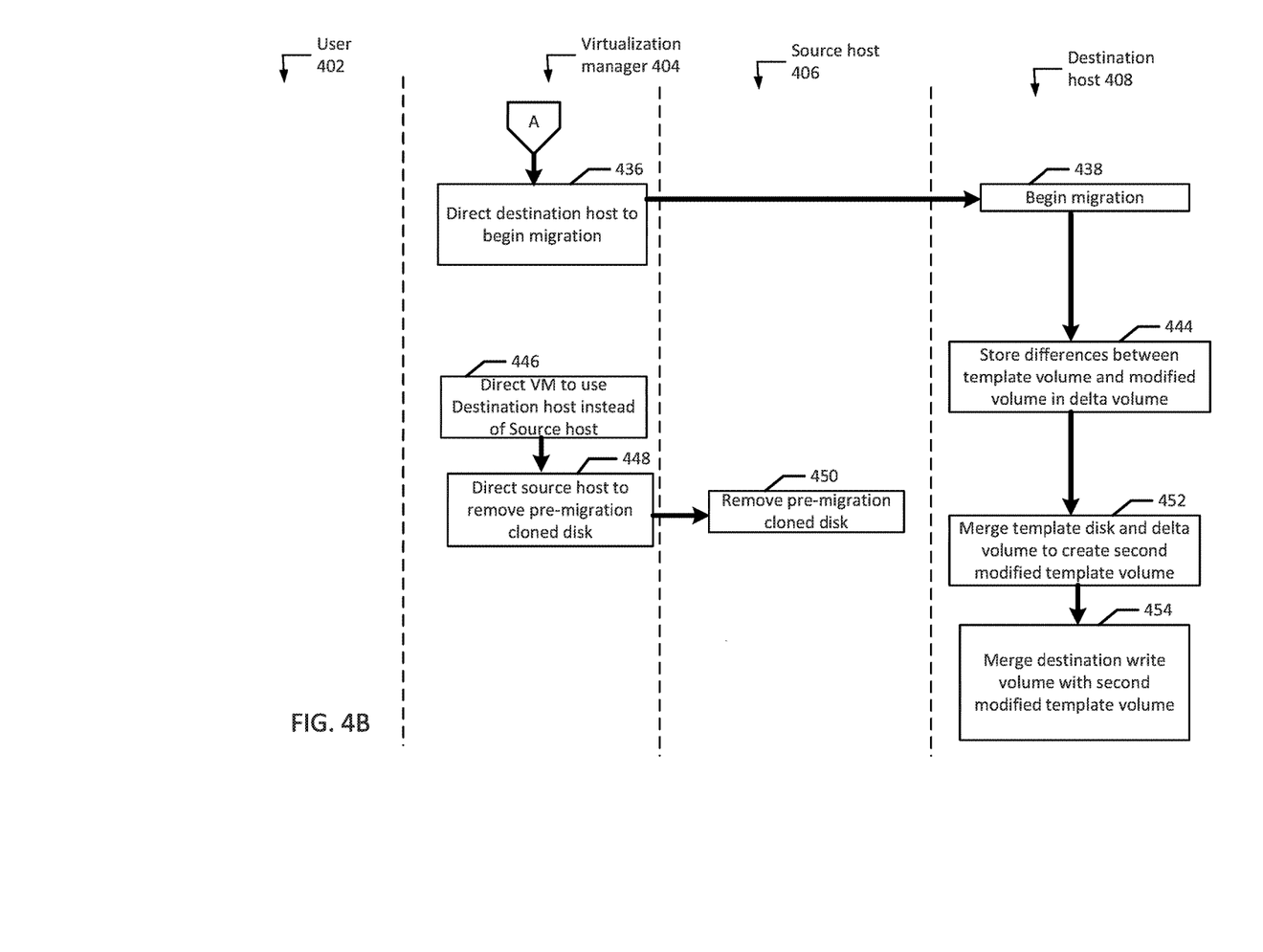

FIGS. 4A to 4B illustrate a flowchart of an example method 400 for fast evacuation of a cloned disk to a storage device. Although the example method 400 is described with reference to the flowchart illustrated in FIGS. 4A to 4B, it will be appreciated that many other methods of performing the acts associated with the method may be used. For example, the order of some of the blocks may be changed, certain blocks may be combined with other blocks, and some of the blocks described are optional. The method 400 may be performed by processing logic that may include hardware (circuitry, dedicated logic, etc.), software, or a combination of both. For example, the method 400 may be performed by a system including a user 402, a virtualization manager 404, a source host 406, and a destination host 408.

In the illustrated example, a user 402 directs the virtualization manager 404 to migrate a disk of a virtual machines from the source host 406 to the destination host 408 (block 410). In an alterative example, there need not be a user 402 that directs the virtualization manager 404 to begin migration, and instead, the migration is initiated singlehandedly by the virtualization manager 404. In an example, the virtualization manager 404 could be an orchestrator or a scheduler.

The virtualization manager 404 receives the request from the user (block 412), and instructs the source host 406 to prepare for migration (block 414). Either simultaneously or sequentially, the virtualization manager 404 instructs the destination host 408 to prepare for migration (block 416).

The source host 406 receives the instruction from the virtualization manager 404 to prepare for migration (block 418), and generates a source write volume (block 420). The destination host 408 receives the instruction from the virtualization manager 404 to prepare for migration (block 424). Destination host 408 then generates a destination write volume (block 426). Additional data written to the source host 406 after preparation for migration has been initiated is stored in source write volume (block 422). The source write volume is located in a pre-migration cloned disk in source host 406. Any data written to the source write volume in source host 406 after the preparation for migration has been initiated is also stored in the destination write volume (block 428). Additionally, the destination host 408 generates a delta volume (block 430). The delta volume could be generated by the destination host 408 before any additional data is written, or alternatively, the delta volume could be generated by the destination host 408 after any additional data is written to the source write volume or the destination write volume. The delta volume and the destination write volume are located in a cloned disk in destination host 408.

Next, the virtualization manager 404 directs the source host 406 to begin migration (block 432). The source host receives this instruction and begins migration (block 434), which begins a fast evacuation of the virtual machine disk from the source host 406 to the destination host 408. The virtualization manager 404 also directs the destination host 408 to begin migration (block 436). The destination host 408 receives this instruction from the virtualization manager 404, and begins migration (block 438).

Next, destination host 408 stores differences between a template volume and a modified template volume in the delta volume (block 444). For example, these differences could include 5 gigabytes of added data, and 1 gigabyte of override data (e.g., modified data, deleted data). For example, the override data could be a part of all template volumes. The differences may be stored as a QCOW file, or in a format similar to a QCOW file format. In an example, after storing the differences in the delta volume, a complete structure of the pre-migration cloned disk exists on the destination host 408, and all the data of the pre-migration cloned disk is located on the cloned disk, and a virtual machine may begin using the cloned disk at this point.

Next, the virtualization manager 404 directs any existing virtual machines running with the pre-migration cloned disk in the source host 406 to switch and begin running with the cloned disk at the destination host 408 (block 446). In an alternative embodiment, there may be no virtual machines running with source host 406, the virtualization manager 404 changes virtual machine configurations to use the cloned disk on destination host 408, rather than the pre-migration cloned disk in the source host 406. In the alternative example, this modified configuration would cause virtual machines started after this step to use the cloned disk at the destination host 408.

Next, the virtualization manager 404 directs the source host to remove a pre-migration cloned disk from the source host (block 448). In response, the source host 406 removes the pre-migration cloned disk (block 450). Once removed, the space may be used in memory for other virtual machines, processes, or tasks.

Next, the destination host 408 merges a template disk located in the destination host 408 and the delta volume to create a second modified template volume (block 452). Then, the destination host 408 merges the destination write volume with the second modified template volume (block 454). In an alternative example, if no new data is stored in the destination write volume, the destination host 408 may not need to merge the destination write volume with the second modified template volume, and could optionally delete the destination write volume instead, for example, and the virtualization manager 404 may also ask the virtual machine to run with the second modified template volume.

Figure 5:
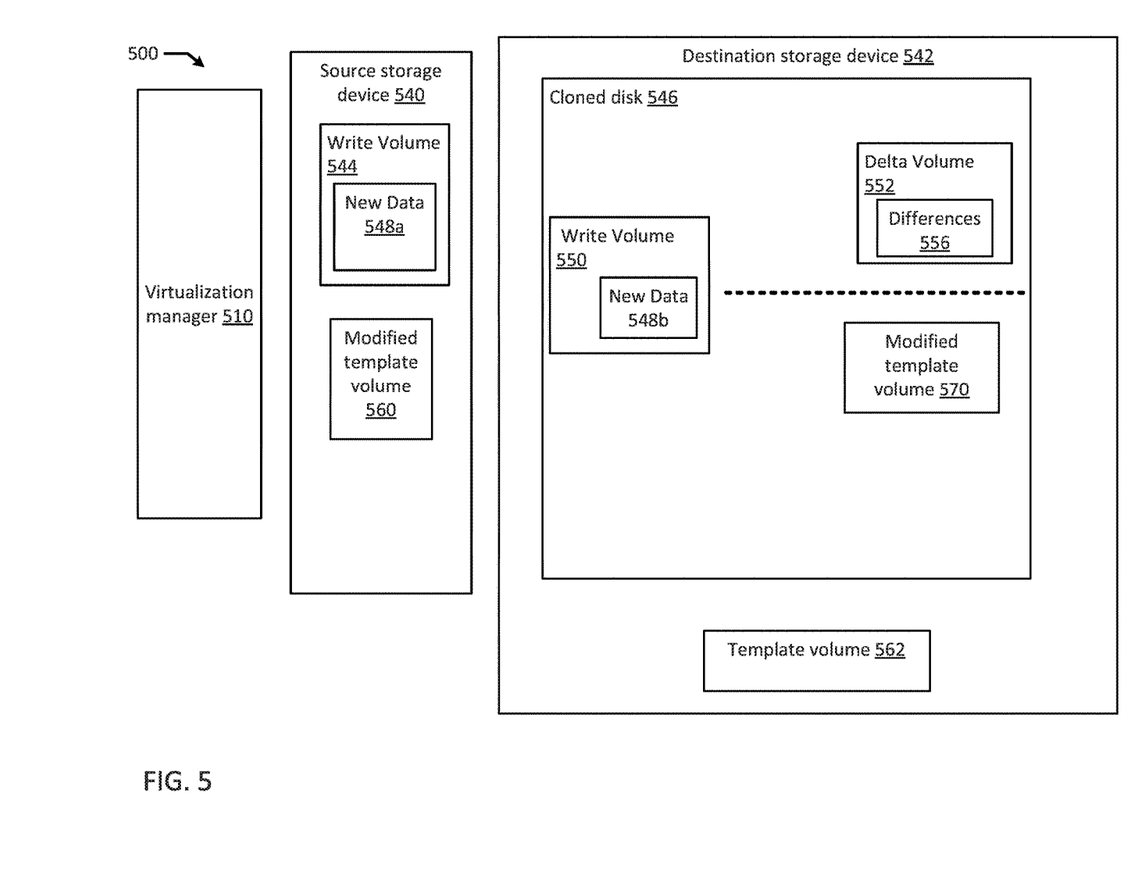
FIG. 5 is a block diagram of a virtualization system according to an example of the present disclosure.

FIG. 5 is a block diagram of an example virtualization system according to an example of the present disclosure. As illustrated in FIG. 5, an example system 500 may include a virtualization manager 510, a source storage device 540, and a destination storage device 542.

In the example system 500, the source storage device 540 includes a write volume 544 and a modified template volume 560. The write volume 544 includes new data 548a.

In an example, the destination storage device 542 includes a cloned disk 546 and a template volume 562. The cloned disk includes a write volume 550 and a delta volume 552. The write volume 550 also includes a copy of the new data 548a, shown as 548b. The new data 548a and the new data 548b are identical. The delta volume 552 includes differences 556.

The example system 500 includes dotted lines which represent a change over time. In an example, the template volume 562 and the delta volume 552 will be merged to create a modified template volume 570.

It will be appreciated that all of the disclosed methods and procedures described herein can be implemented using one or more computer programs or components. These components may be provided as a series of computer instructions on any conventional computer readable medium or machine readable medium, including volatile or non-volatile memory, such as RAM, ROM, flash memory, magnetic or optical disks, optical memory, or other storage media. The instructions may be provided as software or firmware, and/or may be implemented in whole or in part in hardware components such as ASICs, FPGAs, DSPs or any other similar devices. The instructions may be configured to be executed by one or more processors, which when executing the series of computer instructions, performs or facilitates the performance of all or part of the disclosed methods and procedures.

The examples may be embodied in the form of computer-implemented processes and apparatuses for practicing those processes. An example may also be embodied in the form of a computer program code containing instructions embodied in tangible media, such as floppy diskettes, CD-ROMs, DVD-ROMs, hard drives, or any other computer readable non-transitory storage medium, wherein, when the computer program code is loaded into and executed by a computer, the computer becomes an apparatus for carrying out the method. An example may also be embodied in the form of computer program code, for example, whether stored in a storage medium, loaded into and/or executed by a computer, or transmitted over some transmission medium, such as over electrical wiring or cabling, through fiber optics, or via electromagnetic radiation, where when the computer program code is loaded into and executed by a computer, the computer becomes an apparatus for carrying out the method. When implemented on a general-purpose microprocessor, the computer program code segments configure the microprocessor to create specific logic circuits.

It should be understood that various changes and modifications to the examples described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A method of optimizing the migration of vi al disks, the method comprising:
   generating, by a source storage device, a first write volume, wherein a new written data is stored in the first write volume;
   generating, by a destination storage device, a second write volume, wherein the new written data is stored in the second write volume;
   generating, by the destination storage device, a delta volume in a cloned disk, wherein the cloned disk is located in the destination storage device;
   storing, to the delta volume, differences between a template volume and a modified template volume; and
   merging, by the destination storage device, the template volume and the delta volume in the destination storage device creating a second modified template volume.

2. The method of claim 1, further comprising:
   sending, by a virtualization manager, an instruction to prepare for migration of a cloned disk from the source storage device to the destination storage device;
   sending, by the virtualization manager, an instruction to migrate to the source storage device and the destination storage device;
   sending, by the virtualization manager, an instruction to employ the cloned disk to a virtual machine; and
   sending, by the virtualization manager, an instruction to remove the modified template volume from the source storage device.

3. The method of claim 2, further comprising:
   sending, by a user, the instruction to the virtualization manager to migrate the cloned disk from the source storage device to the destination storage device.

4. The method of claim 2, wherein the virtualization manager is one of an orchestrator and a scheduler.

5. The method of claim 1, further comprising:
   merging, by the destination storage device, the second write volume and the second modified template volume creating a third modified template volume.

6. The method of claim 1, further comprising:
   copying, from the source storage device, a snapshot volume to create a copy snapshot volume;
   storing, in the cloned disk, the copy snapshot volume; and
   merging, by the destination storage device, the second write volume with the copy snapshot volume.

7. The method of claim 6, wherein the copy snapshot volume is a virtual disk snapshot.

8. The method of claim 1, further comprising:
   copying, from the source storage device, a plurality of snapshot volumes to create a plurality of copied snapshot volumes, wherein the plurality of copied snapshot volumes includes a top copied snapshot volume;
   storing, in the cloned disk, the plurality of copied snapshot volumes including the top copied snapshot volume; and
   merging, by the destination storage device, the top copied snapshot volume with the second write volume.

9. The method of claim 8, wherein the plurality of copied snapshot volumes are virtual disk snapshots.

10. The method of claim 1, wherein the modified template volume and the second modified template volume are identical.

11. The method of claim 1, further comprising:
    removing, by the source storage device, a pre-migration cloned disk from the source storage device.

12. The method of claim 1, further comprising:
    recording, by at least one of the source storage device, the destination storage device, and the virtualization manager, the differences between the template volume and the modified template volume stored in the delta volume.

13. The method of claim 1, wherein the template volume, located in an original template disk, remains unmodified at the destination storage device.

14. The method of claim 13, further comprising:
    receiving, at the virtualization manager, a second instruction to migrate a second cloned disk from a second source storage device to the destination storage device;
    generating, by the destination storage device, a second delta volume in the second cloned disk;
    storing, to the second delta volume, differences between the template volume and a fourth modified template volume; and
    merging, by the destination storage device, the template volume and the second delta volume creating a fifth modified template volume.

15. The method of claim 1, wherein the modified template volume includes override data.

16. The method of claim 1, wherein the source storage device includes a copy of an original template disk.

17. The method of claim 16, wherein the original template disk contains the template volume at the source storage device.

18. The method of claim 17, further comprising:
receiving, at the virtualization manager, a third instruction to migrate a third cloned disk from a second source storage device to the source storage device;
generating, by the source storage device, a third delta volume in the third cloned disk;
storing, to the third delta volume, differences between the template volume and a sixth modified template volume; and
merging, by the source storage device, the template volume and the third delta volume creating a seventh modified template volume.

19. A system comprising:
a virtualization manager; and
one or more storage devices, including a destination storage device and a source storage device, wherein the one or more storage devices:
generate, by the source storage device, a first write volume, wherein a new written data is stored in the first write volume;
generate, by the destination storage device, a second write volume, wherein the new written data is stored in the second write volume;
generate, by the destination storage device, a delta volume in a cloned disk, wherein the cloned disk is located in the destination storage device;
store, to the delta volume, differences between a template volume and a modified template volume; and
merge, by the destination storage device, the template volume and the delta volume in the destination storage device creating a second modified template volume.

20. A non-transitory machine readable medium storing instructions, which when executed by one or more physical processors, cause the one or more physical processors to:
generate, by the source storage device, a first write volume, wherein a new written data is stored in the first write volume;
generate, by the destination storage device, a second write volume, wherein the new written data is stored in the second write volume;
generate, by the destination storage device, a delta volume in a cloned disk, wherein the cloned disk is located in the destination storage device;
store, to the delta volume, differences between a template volume and a modified template volume; and
merge, by the destination storage device, the template volume and the delta volume in the destination storage device creating a second modified template volume.

* * * * *